Nov. 14, 1967   G. B. GREENE   3,352,488
FLUIDIC TELEMETERING APPARATUS FOR QUANTITY METERS
Filed Oct. 24, 1966   2 Sheets-Sheet 1

INVENTOR.
GEORGE B. GREENE
BY *Rankin A. Milliken*
ATTORNEY

Nov. 14, 1967  G. B. GREENE  3,352,488
FLUIDIC TELEMETERING APPARATUS FOR QUANTITY METERS
Filed Oct. 24, 1966  2 Sheets-Sheet 2

INVENTOR.
GEORGE B. GREENE
BY
ATTORNEY

United States Patent Office 3,352,488
Patented Nov. 14, 1967

3,352,488
FLUIDIC TELEMETERING APPARATUS FOR QUANTITY METERS
George B. Greene, Lafayette, Calif. (% Greene Engineering Co., 2 Giant Road, Richmond, Calif. 94806)
Filed Oct. 24, 1966, Ser. No. 588,993
8 Claims. (Cl. 235—91)

ABSTRACT OF THE DISCLOSURE

An apparatus for indicating the reading of a utility meter within a building at a location outside the building, consisting of a transmitter located in the housing of the utility meter and connected to the movement of the meter, a receiver including a counter from which the reading of the meter can be read, and two tubes connecting the receiver and transmitter. The transmitter has two separate chambers alternately opened and closed by the meter movement, and the receiver has a similar pair of chambers which are opened and closed by the alternations in fluid pressure received from the transmitter chambers via the connecting tubes. The opening and closing of the receiver chambers advances the counter.

---

*Background of the invention*

The present invention relates to improvements in fluidic telemetering devices for quantity meters.

The invention has particular application to water meters and other domestic utility meters which are customarily located in the basements of residences, or otherwise located indoors of the buildings being served thereby. This indoor location is desirable or essential in localities subject to wide temperature changes or freezing weather, where it is not practicable to locate a utility meter in an outdoor location. The indoor location of such meters has long presented problems of considerable magnitude to the public utility companies because of the numerous instances wherein the meter reader is unable to obtain access to the meter owing to the fact that there is no occupant in the building served. There has been a long-felt want for satisfactory telemetering apparatus which will enable the meter reader to make a meter reading at a point outside of the house or other building in which an associated utility meter is installed, and several types and constructions of such telemeters have been heretofore proposed.

The requirements of a satisfactory design for such telemetering apparatus are rather exacting, however, and these prior art devices have generally not been entirely satisfactory for one reason or another. For example, such a telemeter must have a high degree of accuracy and reliability of performance; it should not require servicing; it should not be dependent upon an electric light or power circuit as a source of operating energy, or upon batteries which must be periodically replaced; and its construction should be sufficiently simple and inexpensive so that the cost of the device and its installation is more than offset by the cost of repeated visits of a meter reader to a residence for obtaining access to the meter.

Among the more satisfactory telemetering devices for quantity meters which have heretofore been developed are those which operate upon fluid impulse transmission principles, wherein the indoor meter and the outdoor register are connected by a single conduit through which fluid impulses are transferred from the meter to the register. This general type of apparatus is disclosed in U.S. Patents 2,858,982; 2,858,983; and Reissue 23,800.

These prior art fluid impulse transmission telemetering devices are characterized, however, by certain practical difficulties, including: mechanical complexity of the pulse generating means; drag inherent in the pulse generating means; and the change with age of the characteristics of the spring in which pulse energy is accumulated. In addition, the prior art fluid impulse transmission telemetering devices for quantity meters have been characterized by the need, in practice, for quite elaborate bleeder systems to compensate for variations in ambient temperature and atmospheric pressure. Finally, though by no means least important, the prior art fluid impulse transmission telemetering systems have required a mechanical counter in the remote registration device of the type which includes a substantial return spring and a ratchet and pawl, thus adding considerably to the drag on the meter movement produced by the pulse generator.

*Summary of the invention*

It is therefore an object of the present invention to provide a fluidic telemeter for quantity meters which eliminates the service and supply requirements inherent in electrical telemetering systems used for the same purpose.

Another object of the invention is to provide a telemeter for quantity meters which is simpler and more inexpensive in construction than the devices of the prior art.

Yet another object of the present invention is to provide a fluidic telemeter for quantity meters which eliminates the necessity for the pulse generating means of the prior art, thereby eliminating the drag and spring fatigue problems characteristic of the prior art pulse generating means.

A still further object of the present invention is to provide a fluidic telemeter for quantity meters which does not require auxiliary systems to compensate for variations in ambient temperature and atmospheric pressure.

Yet another object of the present invention is to provide a fluidic telemeter for quantity meters in which the counter employed at the remote reading location may be of a simple and rudimentary type, not requiring substantial return springs, ratches and pawls, and the like.

An additional object of the present invention is to provide a fluidic telemeter for quantity meters of such construction that all of the parts thereof may be small, compact, and adapted to fit within the meter movement housings of presently avialable qualtity meters without substantial alternation thereof, if any.

Other objects of the invention will in part be obvious, and will in part appear hereinafter.

Briefly, a particular embodiment of a fluidic telemetering apparatus for quantity meters according to the present invention comprises a fluidic transmitter located at the quantity meter to be served thereby and a fluidic receiver located at a point remote from said fluidic transmitter and adapted to operate a counter under control thereof.

Said fluidic transmitter and said fluidic receiver resemble each other in that each comprises fixed means fixed with respect to its associated element, i.e., meter or counter, and movable means which is rockable with respect to said fixed means about pivot means. Further, each comprises a pair of variable volume chambers, each of said chambers being defined by a portion of the fixed member, a portion of the movable member, and flexible wall means sealed to said portion of said flexible member and said portion of said movable member. In both said fluidic transmitter and said fluidic receiver, one of said chambers is located on one side of said pivot means, and the other of said chambers is located on the other side of said pivot means. Thus, the rocking of the movable member of said fluidic transmitter with respect to its fixed member causes the volumes of said chambers to be altered in opposite sense, i.e., the chamber on a first side of the pivot means being increased in volume when the chamber on a second side of the pivot means is decreased in volume; and, conversely, the chamber on the said first side of said pivot means being decreased in volume when the chamber on said second side of said pivot means is increased in volume.

The interior of a first one of said chambers comprising part of the transmitter is fluid-tightly connected with the interior of a first one of said chambers constituting part of said fluidic receiver. Second conduit means similarly provides fluid-tight communication between the interior of a second one of said chambers comprising a part of said fluidic transmitter and the interior of a second one of said chambers comprising a part of said fluidic receiver. That is to say, the first transmitter chamber and the first receiver chamber intercommunicate by means of a first conduit, the combination of said first transmitter chamber, first receiver chamber, and conduit being itself sealed against admission of the ambient atmosphere. Similarly, the second transmitter chamber, the second receiver chamber, and a conduit communicating therebetween constitute a combination which is itself sealed against admission of ambient atmosphere. Thus, it follows that the variation of the volumes of the transmitter chambers in opposite sense, as described above, will result in corresponding variations of the volumes of the receiver chambers in opposite sense. More particularly, decreasing the volume of the first transmitter chamber, and correspondingly increasing the volume of the second transmitter chamber, will necessarily result in increasing the volume of the first receiver chamber, and correspondingly decreasing the volume of the second receiver chamber.

As may be seen in the drawings, the variation of the volumes of the transmitter chambers in opposite sense is brought about by the rocking of the movable member of the transmitter. Thus, it follows that the variation of volume of the receiver chambers will follow in synchronism the rocking of the movable member of the transmitter. It will also be clear to those having ordinary skill in the art, however, that the movable member of the receiver must move in such manner as to follow the variations in volume of the receiver chambers. Thus the rocking of the movable member of the transmitter causes substantially synchronous rocking of the movable member of the receiver.

Also, according to the present invention, the movable member of the fluidic transmitter is arranged to be rocked by and in synchronism with the rotation of the counter or cyclometer drive shaft of the quantity meter movement. In the receiver, the movable member is interlinked with the actuator of the counter in such manner that the counter is advanced each time the movable member of the receiver rocks.

Thus it will be apparent to those having ordinary skill in the art that in the particular embodiment of the present invention now under discussion the counter comprising part of the remote registration device is caused by the telemetering apparatus according to the invention to at all times maintain the same indication which appears on the counter comprising part of the quantity meter.

Having briefly summarized a particular embodiment of the present invention, it will now be obvious to those having ordinary skill in the art that the objects of the present invention stated above are carried out as follows:

The fluidic transmitter and fluidic receiver of the present invention are of such simple construction (not involving impulse cams, energy storage springs, etc.) that they may be simply and cheaply made, and may be sufficiently small and compact to be located in available space in presently existing quantity meters.

Further, since such impulse cams, energy storage springs, etc., which characterize the devices of the prior art, are not necessary in the present invention, it follows that the considerable drag on the quantity meter so equipped is substantially eliminated.

In addition, the "balanced" or "differential" nature of the present system makes the use of elaborate ambient temperature and atmospheric pressure compensation systems unnecessary. This may be seen by assuming, for example, that the local ambient temperature increases the pressure of the fluid in the two conduits extending between the transmitter and the receiver. Since the pressure of the fluid in these conduits increases equally, the increment of fluid pressure occurring in both of the transmitter chambers is mechanically compensated by the resulting equal and opposite torques around the pivot means. Similarly, the corresponding increment in fluid pressure occurring in the receiver chamber is completely compensated by the resulting equal and opposite torques about the receiver pivot means.

The invention accordingly comprises the features of construction, combination of elements, and arrangement of parts, which will be exemplified in the construction hereinafter set forth, and the scope of the invention will be indicated in the appended claims.

*Brief description of the drawings*

For a fuller understanding of the nature and objects of the invention, reference should be had to the following detailed description taken in connection with the accompanying drawings, in which.

*Description of the preferred embodiment*

Figures 1, 2:
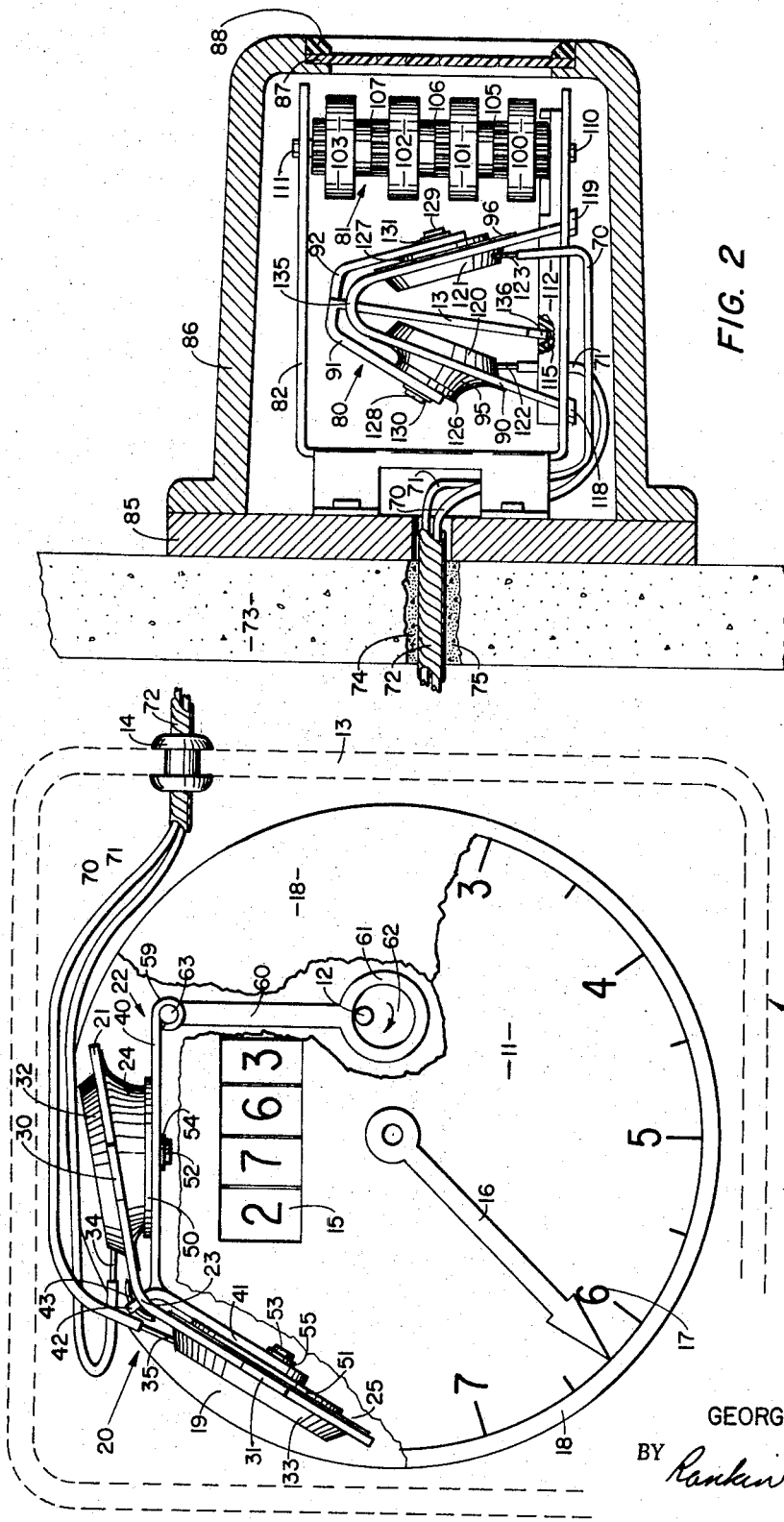
FIGURE 1 represents a quantity meter of the prior art equipped with a fluidic transmitter according to the present invention.
FIGURE 2 represents a remote registration device according to the present invention including a fluidic receiver, a counter driven thereby, and suitable housing means.

Referring now to the drawings, which illustrate an embodiment of the present invention, the reference character 10 designates, in general, a quantity meter or utility meter of the prior art. Behind dial face 11 of quantity meter 10 is located the meter mechanism. For convenience of illustration, and because the number of variant meter mechanisms employed in quantity meters is very great, the practice is adopted of showing only so much of the meter mechanism as is directly utilized in connection with the embodiment of the invention illustrated herein, viz; a shaft 12 comprising part of the gear train used to operate the dial and its associated counter. The remainder of the meter mechanism is assumed to exist within a suitable housing 13, which is in turn equipped with a suitable grommet 14 adapted to prevent chafing of a pair of fluid-conducting tubes passing therethrough. Grommet 14 may, of course, be replaced with a suitable fluid-tight seal if it is desired to seal housing 13 against the entry of ambient fluids. Quantity meter 10 may be of the well-known type in which a counter 15 is provided for direct indication of the higher orders of its readings, while a dial pointer 16 coacting with a scale 17 is employed to indicate the lowest order or orders thereof. As is well known to those having ordinary skill in the art, counter 15 and pointer 16 will, in general, be driven by an element of the meter mechanism such as a shaft 12.

In the meter mechanism employed for illustrative purposes herein, as in many other quantity meter mechanisms, the gear train which drives the counter and pointer is supported between two generally circular plates 18 and 19. In the embodiment of the present invention shown and described herein fluidic transmitter 20 is also supported between plates 18 and 19.

Generally, fluidic transmitter 20 comprises fixed, or stator, means 21 bent at its center to form two similar, mutually angulated portions, and movable means 22 adapted to be disposed within the included angle of stator 21 and pivoted thereto by pivot means 23. As may best be seen in FIGURES 3 and 4, fluidic transmitter 20 includes first and second transmitter chambers disposed on opposite sides of pivot means 23. Each of said transmitter chambers is generally comprised of three wall means, viz, first wall means comprising part of fixed means 21, second wall means comprising part of movable means 22, and third wall means which, according to the present embodiment, is a flexible wall (24 and 25) extending between fixed means 21 and movable means 22. Thus, the second transmitter chamber, seen at the top of FIGURE 1, comprises flexible wall or diaphragm 24, that portion of fixed member 21 located within the area over which the outer edge of diaphragm 24 is sealed to fixed means 21, and that portion of movable member 22 to which the inner portion of diaphragm 24 is sealed, all of which may be better understood by reference to FIGURES 3 and 4. The first transmitter chamber of the present embodiment comprises diaphragm 25 and corresponding portions of stator 21 and movable member 22. Since movable member 22 is rocked to its extreme clockwise position as shown in FIGURE 1, only the edge of diaphragm 25 cemented to stator 21 can be seen in FIGURE 1.

Stator 21 may be secured between plates 18 and 19 in any manner chosen by one having ordinary skill in the art, the expedient adopted in the embodiment illustrated herein being that of inserting ears 30 and 31 of the stator into slots provided in plate 18, and at the same time providing longer ears 30′ and 31′ in the opposite side of fixed member 21, passing these longer ears through corresponding slots in plate 19, and slightly twisting these longer ears to maintain fixed member 21 in place within plates 18 and 19 against vibration, etc.

Those portions of fixed member 21 which coact with diaphragms 24 and 25 are provided in the form of dished "pan" members 32 and 33. When employing this arrangement it is preferable to arrange the stroke of diaphragm members 24 and 25 so that these diaphragms are not stretched, i.e., elastically stressed in elongation. Rather, these diaphragms should be mounted in sack-like fashion and flexed between their two extreme positions without stretching, thereby insuring that only the flexural compliance forces of diaphragms 24 and 25, which are extremely small, need be supplied in the information transmission function of the devices of this embodiment. Pans 32 and 33 are equipped, respectively, with output pipes 34 and 35 by which access may be had to the interiors of the transmitter chambers, and information transmitted therefrom. As may be better seen in FIGURES 3 and 4, movable member 22 comprises first and second arms 40 and 41. Arm 40, part of which is considerably wider than arm 41, has two integral tabs 42 bent outwardly and away from the smaller angle defined by arms 40 and 41. Movable member 22 is pivoted to fixed member 21 by the insertion of the tabs 42 into suitable slots in fixed member 21, these tabs being maintained in place in said slots by means, for example, of a suitable spring clip 43. It will be understood by those having ordinary skill in the art, however, that many other suitable and effective pivot means for pivoting movable member 22 with respect to fixed member 21 may be provided without the exercise of invention.

Figure 3:
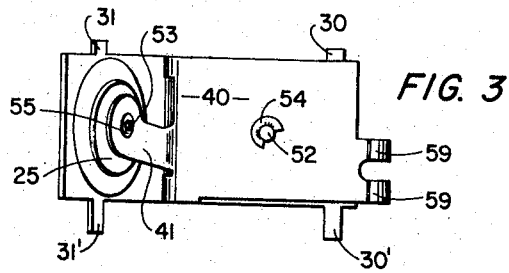
FIGURES 3 and 4 are detailed views of a fluidic transmitter according to the invention.
Figure 5:
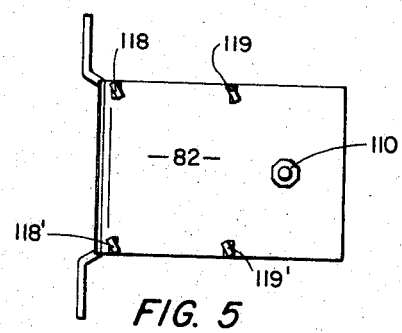
FIGURES 5 and 6 are detailed views of a fluidic receiver according to the present invention, and an associated counter, or cyclometer.
Figure 4:
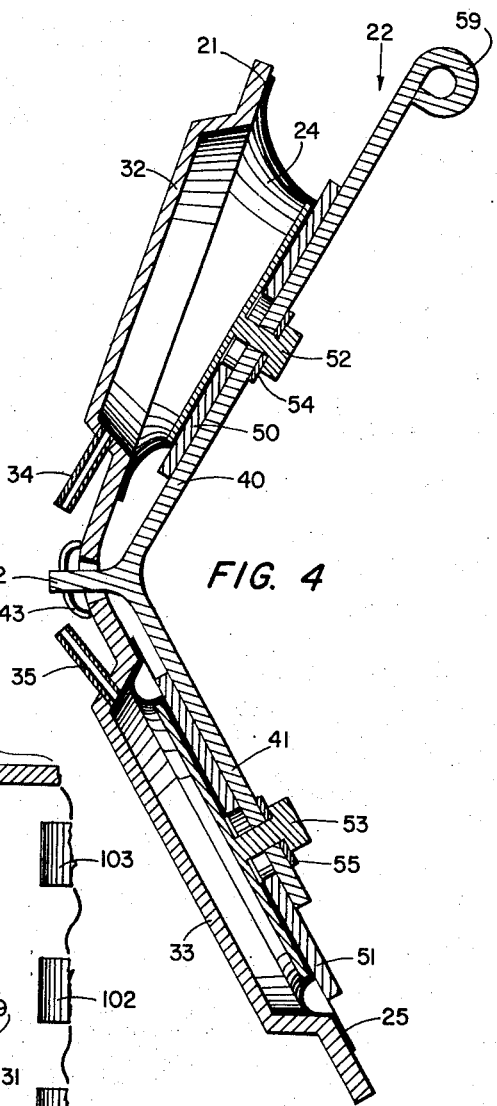
Figure 6:
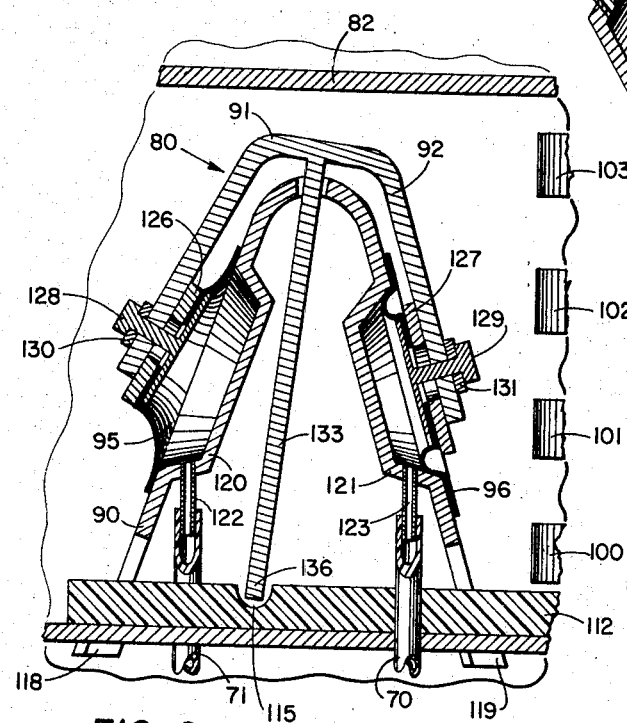

As may be seen in FIGURES 1, 3, and 4, the expedient is employed herein of affixing the inner portions of diaphragms 24 and 25, respectively, to disks 50 and 51, which are in turn affixed to arms 40 and 41. Disk 50, for example, is affixed to arm 40 by means of stud 52 and retaining ring 54 while disk 51 is similarly affixed to arm 41 by means of stud 53 and retaining ring 55. By the use of these disks, which are generally slightly smaller in diameter than the average diameter of pans 32 and 33, the active areas of diaphragms 24 and 25 are minimized.

The rocking of movable member 22 with respect to fixed member 21 described hereinabove is brought about in the instant embodiment of the invention by means of hinge 59 which couples eccentric arm 60 to movable member 22. Eccentric arm 60 is equipped, at its end opposite from hinge 59, with generally circular, cam-embracing means 61 which freely, slidingly embraces cam 62 affixed to the hereinbefore described shaft 12 of meter mechanism 10. Hinge 59 is equipped with a conventional hinge pin 63 which engages a suitable loose-fitting hole, or bearing, provided in the upper end of eccentric arm 60, and as may best be seen in FIGURE 3, is clampingly embraced in overturned ends of the ears making up hinge 59. As may be seen in FIGURE 1, fluidic transmitter 20 is coupled to its corresponding fluidic receiver (FIGURE 2) by means of a pair of small bore tubes, or conduits, 70 and 71. These tubes may be interconnected with the interiors of the first and second transmitter chambers by merely forcing them over the ends of outlet pipes 34 and 35 respectively. The outer ends of these conduits are passed through the hereinabove described grommet 14 and extended to the fluidic receiver (FIGURE 2) within suitable armor 72, the quantity meter of FIGURE 1 being located within, say, the basement of a building being serviced, while the receiver is located without the basement walls 73 for easy access by a meter reader. In this event tubes 70 and 71 within armor 72 will generally be passed through a hole 74 drilled through wall 73, hole 74 being filled with grout or other suitable sealing material where leak-proofing of the basement requires this step.

Considering now the construction of the remote registration device of FIGURE 2, it will be seen that this device contains a receiver 80 in many ways similar in structure to fluidic transmitter 20. In addition, the remote registration device contains a counter 81. While, as will be apparent to those having ordinary skill in the art, certain particularly simple types of counters may be employed in connection with the device of the invention, it is to be noted that the present invention is not limited to the employment of such rudimentary counters, but rather that the word "counter" as employed herein is used in its broadest sense, in which it is defined, for instance, in chapter 1 of "Mathematical Machines," volume I, Digital Computers, by Francis J. Murray, Columbia University Press, New York, 1961, pages 8 and 9. Fluidic receiver 80 and counter 81 are maintained in fixed relation by means of a one-piece frame 82 in the present embodiment. Frame 82 carrying receiver 80 and counter 81 is mounted upon a base 85 and, in view of its usually exposed location, is commonly protected by a cover 86. For purposes of reading counter 81 a window 87 is provided in the end of case 86 remote from base 85. This window is maintained in a suitable opening in case 86 by means of a retaining ring 88 the details of which are within the scope of ordinary skill in the art, and thus are not shown herein.

Receiver 80 comprises fixed means, or stator 90 and movable means 91, 92. Diaphragms 95 and 96 are sealed between stator 90 and movable means 91, 92 in a manner similar to that in which diaphragms 24 and 25 are disposed between the stator and the movable means in fluidic transmitter 20.

Generally, counter or cyclometer 81 comprises well-known number wheels 100, 101, 102, and 103 having well-known tens carrying devices 105, 106, and 107 operatively disposed therebetween. Since many counter structures adapted to this application will suggest themselves to those having ordinary skill in the art, some of which are described in the volume cited above, no further details of counter 81 will be given, save to point out that counter 81 is mounted in frame 82 by means of bearings 110 and 111, and that actuator 112 of counter 81 is longitudinally, slidably mounted on the lower side of frame 82 as seen in FIGURE 2, passing through suitable openings provided in the legs of fixed means 90. Means for slidably mounting actuator 112 upon frame 82 may be provided by exercise of ordinary skill in the art, and will not be described nor shown here. It is to be noted in connection with the present embodiment, however, that actuator 112 has provided in its upper surface as shown in FIGURE 2 a cavity 115 by means of which it can be impelled toward and away from counter 81, thereby successively advancing counter 81.

Stator 90 is provided with pans 120 and 121 which function in a manner similar to pans 32 and 33 of fluidic transmitter 20. Similarly, pans 120 and 121 are provided with output tubes 122 and 123 which function in a manner similar to output tubes 34 and 35 of fluidic transmitter 20 of FIGURE 1. Also, movable arms 91 and 92 are provided with disks 126 and 127 which are similar in function to disks 50 and 51 of fluidic transmitter 20 of FIGURE 1. Disk 126 is affixed to movable member 91 by means of stud 128 and retaining ring 130, while disk 127 is affixed to movable member 92 by means of stud 129 and retaining ring 131.

Movable means 91 and 92, according to the present embodiment, are fashioned from a single piece of metal, which also provides a central arm 133, said central arm 133 being pivoted to fixed means 90 at 135. The nature of pivot 135 will not be described herein, since many arrangements may be provided to serve this purpose by those having ordinary skill in the art. In assembling the device of the present invention, however, arm 133 is merely passed downward through a T-shaped slot in fixed means 90, after which it is slightly displaced into the narrow portion of the T-shaped slot, and retained there by the restraining effect of diaphragms 95 and 96. At the lower end of arm 133 is disposed a finger 136 which interfits with cavity 115 in actuator 112 to actuate counter 81 each time arm 133 is deflected through a full cycle.

*Operation*

Consider FIGURES 1 and 2 which, taken together, illustrate a typical fluidic telemetering system for quantity meters according to the present invention, it may be seen that the telemeter according to the invention may be efficiently used to indicate at a location remote from a quantity meter the measurement indicated by that quantity meter.

In the present embodiment shaft 12 of the meter mechanism drives counter 15 of the quantity meter (FIGURE 1). Shaft 12 also drives eccentric arm 60. As may be seen in FIGURE 1, however, each full reciprocation of eccentric arm 60 rocks movable means 22 of fluidic transmitter 20 through a full cycle. Thus, movable means 22 rocks through a full cycle with each unit advance of counter 15 of quantity meter 10. During each such cycle the second transmitter chamber closes while the first transmitter chamber opens, and then the second transmitter chamber reopens while the first transmitter chamber recloses. Since the second transmitter chamber is interconnected with the interior of the second receiver chamber by means of conduit 70, in fluid-tight relation and without valve means, it follows that when the second transmitter chamber has fully closed the second receiver chamber must fully open, and that when the second transmitter chamber has reopened, the second receiver chamber must be fully closed. Similarly, as the first transmitter chamber fully opens in the first half of each operating cycle, the first receiver chamber must fully close, and when the first transmitter chamber fully closes in the second half of the operating cycle the first receiver chamber must fully open. Started more briefly, movable means 91, 92 of fluidic receiver 80 follows movable means 22 of fluidic transmitter 20 as movable means 22 is rocked in synchronism with the operation of counter 15. Movable means 91, 92 however, are integral with central arm 133 which in turn advances counter 81 by a unit count with each full rocking of movable means 91, 92. Thus it follows that by the operation of this embodiment of the invention counter 81 is caused to constantly indicate the same reading as counter 15 in a simple and efficient manner. It is to be particularly noted that the operation of the device of the invention is carried out without snail cams, energy storage springs, or other drag-inducing pulse generator arrangements characteristic of prior art devices. This is made possible, of course, by the efficient husbanding of available energy achieved by the device of the present invention. This peculiar efficiency of operation characteristic of the present invention arises from the fact that the transmitter of the invention operates uninterruptedly, that is, by continuous transmission of driving power to the remote registration device, as distinct from the pulse transmission of the drive power characteristic of prior art devices. Put differently, the variation of volume of the transmitter chambers is a continuous function of the rate of operation, of the quantity meter. That is, the operation of the fluidic transmitter, and the transmission of power to the remote registration device, are characterized by being free from mathematical discontinuities.

It will be appreciated that by the above described constructions a fluidic telemetering system for quantity meters is provided which is free of means for producing abrupt motion, and is differentially balanced against the adverse effects of ambient temperature and atmospheric pressure.

It will thus be seen that the objects set forth above, among those made apparent from the preceding description, are efficiently attained, and, since certain changes may be made in the above constructions without departing from the scope of the invention, it is intended that all matter contained in the above description, or shown in the accompanying drawings, shall be interpreted as illustrative and not in a limiting sense.

It is also to be understood that the following claims are intended to cover all the generic and specific features of the invention herein described, and all statements of the scope of the invention which, as a matter of language, might be said to fall therebetween.

What is claimed is:

1. Fluidic telemetering apparatus for quantity meters, comprising: first and second variable volume transmitter chambers located at a quantity meter; first and second variable volume receiver chambers located at a remote counter registration device; a first conduit interconnecting the interior of said first transmitter chamber with the interior of said first receiver chamber; a second conduit interconnecting the interior of said second transmitter chamber with the interior of said second receiver chamber; means connected to said quantity meter for recurrently varying the volumes of said transmitter chambers in opposite sense and at a rate determined by the rate of operation of said quantity meter, the volumes of said receiver chambers being thereby varied in opposite sense at a rate determined by the rate of operation of said quantity meter; and means connected to said counter for converting the recurrent variation in volume of said receiver chambers into recurrent movements, whereby said counter is caused to indicate the quantity measured by said meter.

2. Fluidic telemetering apparatus as claimed in claim 1 in which said means for recurrently varying the volumes of said transmitter chamber varies the volumes of said transmitter chambers uninterruptedly.

3. Fluidic telemetering apparatus as claimed in claim 1 in which the variation of the volume of each of said transmitter chambers is a continuous function of the rate of operation of said quantity meter.

4. Fluidic telemetering apparatus as claimed in claim 1 in which said means for recurrently varying the volumes of said transmitter chambers comprises fixed means affixed to said meter and movable means rockable with respect to said fixed means about pivot means, both of said transmitter chambers having first wall means comprising part of said fixed means and second wall means comprising part of said movable means.

5. Fluidic telemetering apparatus as claimed in claim 4 in which a part of said movable means remote from said pivot means is coupled to a moving element of said meter, whereby said fixed means is caused to rock about said pivot means in synchronism with the movement of said moving element.

6. Fluidic telemetering apparatus as claimed in claim 5, in which each of said transmitter chambers comprises: said first wall means; said second wall means; and third wall means extending between said fixed means and said movable means, said third wall means being flexible.

7. Registration means for use in fluidic telemetering apparatus for quantity meters, comprising: counter means; actuator means for actuating said counter means; fixed means fixed with respect to said counter means; movable means rockable with respect to said fixed means about pivot means; first and second variable volume receiver chambers comprising flexible wall means extending between said fixed means and said movable means and located on opposite sides of said pivot means; and link means linking said actuator means with said movable means, whereby said counter means may be advanced by the recurrent variation of the volumes of said receiver chambers in opposite sense.

8. A transmitter for use in fluidic telemetering apparatus for quantity meters, comprising: fixed means adapted to be affixed to a quantity meter; movable means adapted to be rocked with respect to said fixed means about pivot means; first and second flexible wall means each defining with a part of said fixed means and a part of said movable means a transmitter chamber, said transmitter chambers being located on opposite sides of said pivot means; conduit means providing access to the interiors of said transmitter chambers; and means adapted for coupling said movable means with a movable element of said meter whereby to rock said movable means in synchronism therewith.

References Cited
UNITED STATES PATENTS

| | | | |
|---|---|---|---|
| 2,553,842 | 5/1951 | Bickel et al. | 235—91 |
| 2,633,296 | 3/1953 | Dufour | 235—91 |
| 2,858,982 | 11/1958 | Greenwood et al. | 235—91 |
| 2,858,983 | 11/1958 | Holtz et al. | 235—91 |

RICHARD B. WILKINSON, *Primary Examiner.*

L. R. FRANKLIN, *Assistant Examiner.*